(12) United States Patent
Hunwick (10) Patent No.: US 8,496,897 B2
(45) Date of Patent: Jul. 30, 2013

(54) SYSTEM, APPARATUS AND METHOD FOR CARBON DIOXIDE SEQUESTRATION

(76) Inventor: Richard J Hunwick, North Sydney (AU)

( * ) Notice: Subject to any disclaimer, the term of this patent is extended or adjusted under 35 U.S.C. 154(b) by 412 days.

(21) Appl. No.: 12/527,608

(22) PCT Filed: Feb. 20, 2008

(86) PCT No.: PCT/AU2008/000232
§ 371 (c)(1), (2), (4) Date: Sep. 18, 2009

(87) PCT Pub. No.: WO2008/101293
PCT Pub. Date: Aug. 28, 2008

(65) Prior Publication Data
US 2010/0021362 A1    Jan. 28, 2010

(30) Foreign Application Priority Data

Feb. 20, 2007 (AU) ................ 2007900853
May 22, 2007 (AU) ................ 2007902727
Nov. 21, 2007 (AU) ................ 2007906379

(51) Int. Cl.
*B01D 53/62* (2006.01)
*B01D 53/80* (2006.01)
*C01B 33/24* (2006.01)

(52) U.S. Cl.
USPC ........... 423/230; 423/234; 423/331; 423/352

(58) Field of Classification Search
USPC ........... 423/210, 220, 230, 234, 327.1, 328.1, 423/331, 332, 352
See application file for complete search history.

(56) References Cited

U.S. PATENT DOCUMENTS 2,829,060 A * 4/1958 Emblem et al. ............ 106/38.35
4,308,241 A * 12/1981 deVries ........................ 423/210

FOREIGN PATENT DOCUMENTS

| CN | 1106311 A | 8/1995 |
| JP | 2005-097072 | 4/2005 |
| WO | WO 2004/094043 A | 11/2004 |
| WO | WO 2004/098740 A | 11/2004 |
| WO | WO 2005/108297 A | 11/2005 |
| WO | WO 2006/008242 A | 1/2006 |

OTHER PUBLICATIONS

Sugiyama, "Phase Diagram." Aug. 24, 2002. Downloaded Dec. 17, 2009 from http://www.gfd-dennou.org/library/oboro/gallery/output/phase/index.html.en.*

(Continued)

*Primary Examiner* — Stanley Silverman
*Assistant Examiner* — Daniel Berns
(74) *Attorney, Agent, or Firm* — Frommer Lawrence & Haug LLP; Ronald R Santucci (57) ABSTRACT

A carbon dioxide sequestration process includes the following steps. In a first stage, a slurry of a metal silicate rock is mixed with ammonia so as to produce a ammonia/water/metal silicate slurry. In a second stage, the process includes scrubbing a gas stream containing carbon dioxide with the solution from the first stage to thereby absorb the carbon dioxide into a reactive slurry. In a third stage, the reactive slurry from the second stage is passed through a reactor that is controlled so as to promote the reaction between the carbon dioxide and the metal silicate to thereby produce a metal carbonate.

20 Claims, 7 Drawing Sheets

OTHER PUBLICATIONS

Fauth et al., "Carbon dioxide storage as mineral carbonates." ACS Div. of Fuel Chem. Preprints, vol. 45, Issue 4, 2000 (no month), pp. 708-712.*

Ophardt, Charles E., "Virtual Chembook." Elmhurst College (2003). Viewed Aug. 12, 2012 at http://www.elmhurst.edu/~chm/vchembook/174temppres.html.*

Simtronics Corp., "SPM-3100 Amine Treating Unit." Published 2006. Viewed Aug. 12, 2012 at http://www.simtronics.com/catalog/spm/spm3100.htm.*

English translation of second office action issued Apr. 5, 2012 by State Intellectual Property Office of P.R. China for corresponding Chinese application 200880006610.5.

* cited by examiner

SYSTEM, APPARATUS AND METHOD FOR CARBON DIOXIDE SEQUESTRATION

This application is a 371 of PCT/AU2008/000232 filed on Feb. 20, 2008, published on Aug. 28, 2008 under publication number WO 2008/101293 A and claims priority benefits of Australian Patent Application No. 2007900853 filed Feb. 20, 2007, and Australian Patent Application No. 2007902727 filed May 22, 2007, and Australian Patent Application No. 2007906379 filed Nov. 21, 2007, the disclosures of which are hereby incorporated by reference.

TECHNICAL FIELD

This invention relates generally to a system, apparatus and method for carbon dioxide sequestration and more particularly, but not exclusively, to a system and method for the capture and sequestration of carbon dioxide from power station flue gases.

BACKGROUND TO THE INVENTION

There is increased focus on reducing carbon dioxide emissions to the atmosphere, to help minimise the effects of global warming. Carbon dioxide sinks exist naturally, with the main naturally occurring sink being the ocean. Plants are also an effective form of carbon dioxide sink and use photosynthesis to remove carbon from the atmosphere by incorporating it into biomass. However, these naturally occurring sinks are not capable of effectively keeping up with the vast quantities of carbon dioxide being produced in today's power-thirsty climate.

The major source of harmful carbon dioxide gases are large fossil fuel power stations which, when fuelled by black coal, on average typically output around 0.8 to one tonne of the gas for each MegaWatt-hour (MWh) of electricity they generate. For example, a large power station such as the 2,640 MW Bayswater in the Hunter Valley of New South Wales, Australia, in generating 20 million MWh of electricity in a year, would also output 18 million tonnes of carbon dioxide. It would be advantageous if there was a system and method which was capable of capturing and permanently sequestering at least some of the carbon dioxide emitted from such power stations. It would also be advantageous if a system and method were provided for the disposition of the gas to be independently audited.

SUMMARY OF THE INVENTION

In a first aspect the present invention provides a carbon dioxide sequestration process including the steps of:
(i) in a first stage, mixing a slurry of a metal silicate rock with ammonia so as to produce a ammonia/water/metal silicate slurry;
(ii) in a second stage, scrubbing a gas stream containing carbon dioxide with the solution from (i) to thereby absorb the carbon dioxide into a reactive slurry; and
(iii) in a third stage, passing the reactive slurry from (ii) through a reactor that is controlled so as to promote the reaction between the carbon dioxide and the metal silicate and produce a metal carbonate.

It should be noted that the terminology "gas stream containing carbon dioxide" does not mean that the stream contains only carbon dioxide, and may contain other off gases.

In an embodiment of step (i), pressurised liquid ammonia is charged into the metal silicate slurry in such a manner that the liquid ammonia partially flashes to a vapour to produce the ammonia/metal silicate slurry.

An embodiment of step (ii) may comprise exposing the carbon dioxide-containing gas stream to a spray of the slurry.

An embodiment of step (iii) may comprise elevating at least one of a pressure and temperature of the reactor so as to enhance the reaction between the carbon dioxide and the metal silicate.

In an embodiment, the reactor is a pipeline. The pipeline preferably comprises multiple flow paths. In an embodiment, the reaction takes place along the length of one of the flow paths. Another of the flow paths may be utilised to supply the metal silicate slurry to the first stage.

In an embodiment, the method comprises the further step of exchanging at least one of pressure and heat between the reactive slurry and the metal silicate slurry before and/or after the pipeline.

In an embodiment, the reactor is a chamber located in use underground. Preferably, the chamber is located at a depth that provides sufficient pressure to enhance the reaction between the carbon dioxide and the metal silicate. In an embodiment the depth is sufficient for providing sufficient pressure by static head alone.

In an embodiment, the method may also comprise the step of recovering ammonia resulting from the reaction stage (iii) and recycling it to the first stage. In an embodiment, an alkali is added to the final product prior to performing the step of recovering ammonia. The alkali may be power station fly ash or pulverised bottom ash obtained by filtering or otherwise cleaning the carbon dioxide-containing flue gas stream. The ammonia may be recovered as both a liquid and a gas, with the liquid being converted partially to a vapour for recycling in the first stage and the gas being extracted, condensed and mixed with the metal silicate before it is supplied in the first stage.

In an embodiment, the step of recovering the ammonia is effected in a recovery vessel which is pressurised to facilitate the recovery of ammonia in liquid form at ambient temperatures. In an embodiment, the recovery vessel is in use located at a depth sufficient for achieving the pressure to recover the ammonia in liquid form. In an embodiment the depth is sufficient for providing sufficient pressure by static head alone.

In an embodiment the process comprises the further step of grinding a metal silicate rock to produce the metal silicate slurry. The metal silicate slurry may comprise 30 to 60% finely ground solids by weight. In an embodiment, the metal silicate is a magnesium-rich silicate mineral. The magnesium rich silicate may be comprised of a serpentine- and/or olivine- and/or pyroxene-rich mineral.

In accordance with a second aspect, the present invention provides a system for sequestering carbon dioxide from a gas stream, the system comprising:
(a) a first apparatus for removing the carbon dioxide from the gas stream and absorbing it in an ammoniated slurry that contains a metal silicate dispersed through it; and
(b) a reactor for receiving the slurry from (a), the reactor being controlled so as to promote the reaction between the carbon dioxide and the metal silicate and produce a metal carbonate.

In an embodiment, the first apparatus comprises an ammonia absorption chiller arranged to (a) chill the metal silicate slurry and (b) mix the chilled slurry with ammonia to produce the ammoniated slurry. In an embodiment step (a) is carried out prior to step (b).

The reactor may comprise the pipeline as set forth in the first aspect. In an alternative embodiment, the reactor may comprise the chamber as set forth in the first aspect. The metal silicate may comprise a magnesium rich silicate as set forth in the first aspect. In an embodiment, the system comprises a recovery vessel arranged to recover ammonia contained in the metal carbonate product.

In accordance with a third aspect of the present invention, in a pipeline, there is provided a first flow path that carries a metal silicate slurry for use by a first apparatus in a carbon sequestration process; and a second flow path that carries a reactive slurry from the first apparatus and which comprises carbon dioxide absorbed in an ammonia/water/metal silicate slurry, wherein the second flow path is controlled so as to encourage the carbon dioxide to react with the metal silicate and produce a metal carbonate.

In accordance with a fourth aspect of the present invention there is provided a method for causing a slurry, comprising carbon dioxide absorbed in an ammonia/water/metal silicate slurry, to react so as to produce a metal carbonate, the method comprising the steps of: positioning a chamber underground at a depth which is sufficient to provide a pressure in the chamber to enhance the reaction between the carbon dioxide and the metal silicate so as to produce the metal carbonate; and providing the slurry to the chamber for a sufficient period to enable it to react.

In an embodiment, the slurry provided to the chamber is the reactive slurry produced in the process as set forth in the first aspect. In an embodiment the depth is sufficient for providing sufficient pressure by static head alone.

In an embodiment, the method comprises the further step of exchanging heat from the product of the chamber with the slurry provided to the chamber. In an embodiment, the heat is exchanged in one or more heat exchanger units arranged in or at adjacent flow paths of the chamber product and the slurry.

In accordance with a fifth aspect there is provided a power station utilising a carbon sequestration system in accordance with the second aspect, the system arranged to sequester carbon dioxide from flue gas emitted by the power station.

In accordance with a sixth aspect, in an ammonia absorption process in which a slurry of metal silicate rock is mixed with ammonia so as to produce a ammonia/water/metal silicate slurry for use in a carbon dioxide sequestration process, there is provided the steps of: (i) prior to passing ammonia to the absorption process, allowing the ammonia in pressurised liquid form to expand in an evaporator stage so as to provide a cooling effect in that stage; and (ii) passing the water/metal silicate slurry through the evaporator stage so as to chill said water/metal silicate slurry, prior to mixing it with the ammonia in the ammonia absorber process.

In an embodiment, the process comprises the further step of providing the ammoniated slurry to a scrubbing stage, wherein a gas stream containing carbon dioxide is scrubbed with the chilled ammonia/water/metal silicate slurry to thereby absorb the carbon dioxide into a reactive slurry.

In an embodiment, the process comprises the further step of passing reactive slurry which is to be re-circulated through the scrubbing chamber through the evaporator stage prior to re-circulation. The evaporator stage may be implemented in an evaporator chamber. The scrubbing stage may be implemented in the first apparatus, as set forth in the second aspect.

In accordance with a seventh aspect of the present invention there is provided an ammonia absorption chamber arranged to implement the process as set forth in the sixth aspect.

In accordance with an eighth aspect of the present invention there is provided a method of extracting a target metal from a metal silicate comprising the step of mixing the metal silicate with a solution that comprises ammonia and ammonium salt, whereby the ammonia reacts with the metal silicate to cause the target metal to dissolve into the solution.

In an embodiment the method comprises the further step of grinding the metal silicate and forming it into a slurry prior to mixing the metal silicate with the solution.

In an embodiment the mixing takes place in an ammonia absorption chamber.

In an embodiment the metal silicate is a magnesium-rich silicate.

In an embodiment the magnesium-rich silicate is a serpentine and/or olivine and/or pyroxene silicate metal.

In an embodiment the ammonium in solution comprises ammonium carbonate.

In an embodiment the target metal dissolves into the solution and then precipitates as a metal carbonate to be removed for recovery.

In an embodiment the target metal is one or more of magnesium, iron, copper and nickel. The dominant metal within the metal silicate may comprise magnesium.

In a ninth aspect the present invention provides a carbon dioxide sequestration process including the steps of:

(i) in a first stage, mixing a chilled slurry of a metal silicate rock with ammonia so as to produce a chilled ammonia/water/metal silicate slurry;

(ii) in a second stage, scrubbing a gas stream containing carbon dioxide with the chilled solution from (i) to thereby absorb the carbon dioxide into a reactive slurry; and (iii) in a third stage, passing the reactive slurry from (ii) through a reactor that is controlled so as to promote the reaction between the carbon dioxide and the metal silicate and produce a metal carbonate.

BRIEF DESCRIPTION OF THE DRAWINGS

An embodiment of the present invention will now be described, by way of example only, with reference to the accompanying drawings, in which.

DETAILED DESCRIPTION OF AN EMBODIMENT

In the following description, an embodiment of the present invention is described in the context of a system, apparatus and method for the capture and sequestration of carbon dioxide contained within flue gases emitted by a fossil fuel-fired power station. However, it is to be understood that the system, apparatus and method could equally be utilised for the permanent sequestration of carbon dioxide from any source and is not limited to the particular arrangement described herein.

Figure 1:
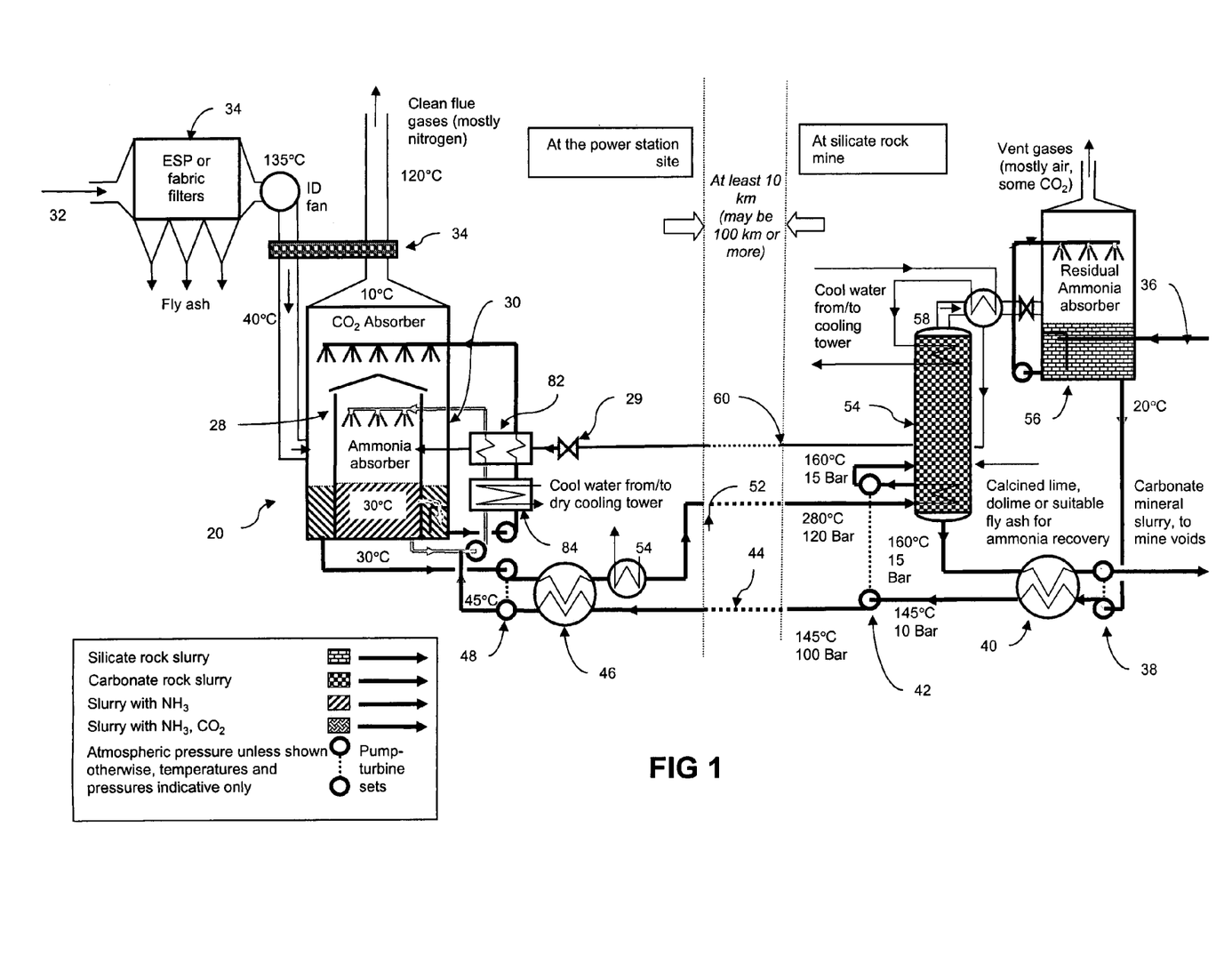
FIG. 1 is a schematic of a carbon dioxide sequestration system according to an embodiment of the present invention.

With reference to FIG. 1 there is shown a flow diagram of a system 10 for performing a carbon dioxide ($CO_2$) sequestration process from a gas feed stream containing carbon dioxide outputted from a power station, in accordance with an embodiment of the present invention. With additional reference to FIG. 2, the system is arranged to perform the process 100 of (i) in a first stage, mixing a slurry of chilled ground metal silicate rock with ammonia so as to produce a ammonia/water/metal silicate slurry; (ii) in a second stage, scrubbing a gas stream containing carbon dioxide with the ammonia/water/metal silicate solution to thereby absorb the carbon dioxide into a reactive solution; and (iii) passing the reactive solution through a reactor that is controlled so as to promote the reaction between the carbon dioxide and the metal silicate and produce a metal carbonate and by-product silica (stage three).

In an embodiment, the slurry of ground metal silicate rock is chilled by circulating the slurry through a vessel in which ammonia evaporates. In an embodiment another stage is carried out prior to stage (ii), namely contacting flue gases in a vessel in a counter-current, staged manner so that residual ammonia in the flue gases is scrubbed from these gases to levels low enough to allow their final discharge in the atmosphere.

In the illustrated embodiment the three stages are performed successively, with the first two stages occurring within a first apparatus 20 in the form of two separate reaction chambers, namely an absorption chamber 28 and a scrubbing chamber 30, and the last stage occurring within a reactor in the form of a pipeline 52 which may, for example, connect the mine site to the power plant. As will be described in detail in subsequent paragraphs of the specification, the reactor may alternatively take the form of an underground chamber (see FIG. 5) excavated at a sufficient depth to facilitate the conditions for the carbonation reactions to take place.

The carbon dioxide sequestration process utilised in embodiments of the present invention is based on mineral carbonation. Mineral carbonation is a reaction between a metal-oxide bearing material and carbon dioxide. The metal-oxide bearing material may for example be alkaline-earth metals. Advantageously, the process 100 does not require the source of carbon dioxide to be particularly pure. In mineral carbonation, carbon dioxide reacts with the metal oxide bearing material to generate insoluble carbonates, that is to say:

$$MO + CO_2 \rightarrow MCO_3 + heat \quad (1)$$

which is an exothermic reaction, occurring more rapidly at elevated temperature, typically above 200° C. Certain chemicals may serve to increase the rate at which this reaction proceeds without being consumed themselves, i.e. they serve as catalysts. The present inventor has discovered that using ammonia as a catalyst has the particular advantage of being able to use a single integrated process for both the isolation of carbon dioxide from a mixture of gases, known as carbon capture, and for its permanent sequestration.

The exact nature of the insoluble carbonates formed by the reaction depends on the metal-oxide bearing material. Suitable materials may be naturally occurring alkaline-earth metal-rich silicate rocks which contain mineral constituents such as serpentinite ($Mg_3Si_2O_5(OH)_4$), olivine ($Mg_2SiO_4$), orthopyroxene ($MgSiO_3$), talc ($Mg_3Si_4O_{10}(OH)_2$) and wollastonite ($CaSiO_3$). In practice, the element Iron (Fe) may substitute for some of the Magnesium (Mg) or Calcium (Ca). Other suitable materials include alkaline industry residues such as slag from steel production, the ash (both fly and bottom) from pulverised coal-fired boilers, the ash remaining from the combustion of paper recycling residues (de-inking ash), and cement. The amount of heat generated in the reaction will depend on the specific metal and on the mineral containing the metal oxide as can be seen below in the case of three natural silicates (heat values are given per unit mole of $CO_2$ and at standard conditions (25° C. and 0.1 MPa):

Olivine $$Mg_2SiO_4 + 2CO_2 \rightarrow 2MgCO_3 + SiO_2 + 89 \text{ kJ mol}^{-1} CO_2 \quad (2a)$$

Serpentine $$Mg_3Si_2O_5(OH)_4 + 3CO_2 \rightarrow 3MgCO_3 + 2SiO_2 + 2H_2O + 64 \text{ kJ mol}^{-1} CO_2 \quad (2b)$$

Wollastonite $$CaSiO_3 + CO_2 \rightarrow CaCO_3 + SiO_2 + 90 \text{ kJ mol}^{-1} CO_2 \quad (2c)$$

A preferred silicate rock (because of its greater abundance in continental land masses) comprises the mineral serpentine, $Mg_3Si_2O_5(OH)_4$. All of these minerals may be pre-treated to increase the surface area of rock that can come into direct contact with the carbon dioxide. In an embodiment, the pre-treatment involves crushing, grinding and/or milling of the mineral, as well as some mechanical classification and separation. Typically, these minerals would be wet-milled in ball mills or equivalent to form a finely ground metal silicate slurry (hereafter 'silicate slurry') 36 wherein 90% of the mineral matter was finer than 40 microns. However, the extent of the pre-treatment is dependent upon the source and type of mineral(s) being used in the process.

With specific reference to FIG. 1, the carbon dioxide sequestration system 10 will now be described in detail. The system 10 receives a raw flue gas mixture feed stream 32 that has been generated and subsequently emitted by a power station (not shown). In the embodiment described herein, the raw flue gas mixture 32 is passed though a filter 34 to remove particulate matter. Suitable filters may include fabric filters, electrostatic precipitators and the like. Cleaning the raw flue gas mixture 32 serves to minimise both the maintenance costs in downstream gas-handling equipment and the concentrations of particulates in flue gases ultimately discharged to the atmosphere. It will be understood, however, that while desirable for process reasons, it is not essential that the raw flue gas mixture 32 be cleaned of particulates before it enters the scrubbing chamber 30.

To maximise heat recovery in the system 10, the filtered flue gas mixture is then passed through a heat exchange apparatus in the form of a heat exchanger 34 so that the sensible heat of the filtered flue gas mixture (typically emitted at a temperature of around 135° C.) is exchanged with the cooler gasses being expelled from the scrubbing chamber 30 of the first apparatus 20 and the filtered flue gas mixture is cooled to its water-vapour saturation temperature (i.e. to about 50° C.). Suitable heat exchangers may include, for example, recuperative-type heat exchangers, such as the Ljungstrom rotary design as used for air pre-heating in power stations.

As mentioned in preceding paragraphs, the carbon dioxide sequestration system 10 receives a source of silicate slurry 36. According to the embodiment described herein, the silicate slurry source is located near or at the mine site from which the silicate rocks are sourced. As previously described, the silicate mineral sourced from the mine site is finely ground (preferably by wet-milling in ball mills or equivalent to form the slurry) wherein 90% of the mineral matter is finer than 40 microns. The silicate slurry 36 is subsequently passed through a first pressure-exchange apparatus 38. To minimise power consumption, the pressure of the silicate slurry 36 may be increased by exchanging pressure with the final metal carbonate/silica product (hereafter 'final product'), typically to a pressure of approximately 10 Bar. In addition, to minimise heat losses from the system 10 (and to ensure that the final product is cooled to a suitable temperature before it is emplaced in its final permanent repository), the silicate slurry 36 passes counter-currently through a second heat exchanger 40 to absorb the surplus sensible heat contained in the final product. At a second pressure-exchange apparatus 42, the pressure of the silicate slurry 36 is further increased, this time to a substantially higher level (typically 100 Bar). Again, this boost in pressure is achieved by exchanging pressure, but this time with the carbonate/silica slurry prior to it undergoing treatment in the ammonia gas recovery vessel 54 (as will be described in detail in subsequent paragraphs).

A pipeline 44 connects the first apparatus 20 to the mine site and is used to transport the silicate slurry 36 used in the sequestration process 100. As will be described in more detail in subsequent paragraphs, an alternate path 52 in the pipeline 44, in this embodiment, also serves to act as a controlled reactor in which the metal carbonate reaction largely takes place. At or near to the power station site, the silicate slurry 36 is passed counter-currently through a third heat exchanger 46 and a third pressure-exchange apparatus 48, where the silicate slurry 36 is cooled and reduced in pressure by exchange with the reactive slurry discharged from the first apparatus 20, before being fed directly into the evaporator vessel 82, where ammonia which has passed through the expansion valve 29 and is now at a very low temperature, cools the silicate slurry to near freezing. To ensure that the silicate slurry 36 is not actually frozen, a portion of this slurry is circulated through the evaporator vessel. The chilled silicate slurry passes downwards through a vessel, the residual ammonia scrubber, in such a way that cleaned and cooled flue gases that have been stripped of most of their carbon dioxide content, pass upwards from below. There may be as many as six counter-current contacting stages, such that the cleaned, largely carbon dioxide-free flue gases may leave the system with less than one part per million of ammonia.

The silicate slurry, now charged with any ammonia arriving in flue gases from below, enters the ammonia absorber 28, where it absorbs into solution all of the ammonia that is recovered in the ammonia recovery vessel 54 so as to produce a ammonia/water/metal silicate slurry.

The ammonia is recycled from the ammonia gas recovery stage of the process (described in subsequent paragraphs), with additional quantities required only to make up for losses, which should be small. Recovered liquid ammonia (which may contain small amounts of water) is supplied to the absorption chamber 28 by way of a pipeline 60, under pressure. In a preferred embodiment, pressurised liquid ammonia passes through the pressure reduction valve 29, which reduces its pressure to near atmospheric, at which pressure it discharges into a vessel, the evaporator chamber 82, prior to entering the absorption chamber 28. A portion of the ammonia will flash to vapour upon entering the evaporator chamber 82. The ammonia, in vaporising, absorbs substantial quantities of latent heat which is withdrawn from the slurries circulating through banks of tubes in the evaporator chamber 82, thereby chilling them to near freezing. In the embodiment shown in FIG. 1, the heat absorbed as the ammonia vaporises is drawn from the silicate slurry used as the residual carbon dioxide scrubbing medium in the residual ammonia scrubbing chamber. This is to ensure that the scrubbing medium last in contact with the cooled, filtered flue gases is the most chilled.

The vaporised ammonia flows from the evaporator chamber 82 directly into the ammonia absorption chamber 28, wherein it is rapidly absorbed into the deluging spray of circulating silicate slurry 36 after this has passed downwards through the several stages of the residual carbon dioxide scrubber, to produce the ammonia/water/metal slurry used as the circulating scrubbing medium for the carbon dioxide scrubbing chamber 30. When the ammonia is absorbed in the silicate slurry 36 a substantial quantity of heat is liberated: the heat of solution of ammonia gas in water. Much of this heat is removed as the slurry circulates through the heat exchanger 84. As illustrated, the heat exchanger 84 and cooling tower also serve to remove much of the excess low-grade heat generated from the absorption of the ammonia in the silicate slurry.

The cooled filtered flue gas mixture passing through the heat exchanger 34 enters the scrubbing chamber 30 where the gas mixture passes upwards through deluging sprays of absorbent slurry, the absorbent slurry having been drawn from the ammonia absorption chamber 28 and discharged into the head space of the scrubbing chamber 30. When carbon dioxide is absorbed in the ammonia/water/metal silicate slurry, a further substantial quantity of heat is liberated, as carbon dioxide and ammonia form in solution a series of ammonium carbonate compounds. With sufficient ammonia supplied to the absorption chamber 28 to achieve 90 percent capture of carbon dioxide, the tendency will be to form the bicarbonate $NH_4HCO_3$ in preference to the normal carbonate $(NH_4)_2CO_3$ and the carbamate, $NH_2COONH_4$, which will also be present in smaller quantities, perhaps along with some urea, $CO(NH_2)_2$. The system 10 is configured such that the coldest slurry will be the last to contact the stripped (of carbon dioxide) flue gas mixture, in such a way that ammonia slip (losses in final flue gases to the atmosphere) are essentially eliminated. In the embodiment shown in FIG. 1, the scrubbing chamber 30 is shown as being constructed separately to the absorption chamber 28. Suitable scrubbing chambers may be generally similar to the type used for flue gas desulphurisation.

As previously described, the sensible heat is removed from the filtered flue gas mixture in the first heat exchanger 34, cooling it to around 50° C., before entering the scrubbing chamber 30. The clean flue gases exiting the scrubbing chamber 30 typically comprise around 95 percent nitrogen and inerts by volume. The balance comprises some oxygen and around 1.5 percent carbon dioxide, being the remnant quantity of this gas after some 90 percent had been stripped out in the scrubbing chamber 30.

The resultant product of this two-stage process is a reactive solution in the form of a metal silicate slurry in an aqueous phase that is itself primarily a solution of ammonium carbonates. A stream of the reactive ammoniated metal silicate slurry (hereafter 'reactive slurry') is drawn from the scrubbing chamber 30 and directed to the mine site via a return pathway 52 of the pipeline 44, which also advantageously acts as a controlled reactor. On route to the mine site, at or near to the power station, the reactive slurry is pressurised at the third pressure-exchange apparatus 48 to a high pressure of around 120 Bar (above the critical pressure of ammonia) and also heated to close to the boiling point of water at the pressure in question. Heating is accomplished firstly by transferring heat from the incoming silicate slurry arriving from the mine at the heat exchanger 46, and also by injection of steam 54. Without being bound by theory, the inventor anticipates that, subject to the process design assumptions of Example 1 (see table below), around 600 tonnes per hour of steam would be required to raise the temperature of the reactive slurry by around 100° C., to say 225° C., at which temperature the carbonation reactions are likely to reach acceptable rates. Heat liberated from the reaction between carbon dioxide and the metal silicate in the reactive slurry, which is highly exothermic, is capable on its own of raising the reactive slurry temperature by around 75° C. (under the assumptions made in respect of Example 1), to yield a final temperature of some 300° C. by the time the reactive slurry reaches the vicinity of the mine site, or site of other final emplacement. This temperature rise would be obtained despite some losses along the length of the return pipeline 52, notwithstanding attempts to minimise such losses by cladding this pipeline 52 throughout its length by suitable insulation (lagging).

In the return pipeline 52 of the pipe reactor, most if not all of the carbon dioxide present in the reactive slurry can react with the silicate minerals and convert to insoluble carbonate during approximately the few first hours of transit. Each hour may correspond to a 10 kilometer length of this pipeline. In practice, however, the power station and the mine site may be much more than this distance apart, thereby allowing more than adequate time for reactions to proceed essentially to completion resulting in the metal carbonate product that contained most if not all of the carbon dioxide originally scrubbed from the power station flue gases. A high concentration of ammonia is maintained in the slurry throughout its passage from the power station to the mine/quarry or other emplacement site.

When the final product in the return pipeline 52 reaches the vicinity of the mine site, as described above, it is passed through the second pressure-exchange apparatus 42 to lower the pressure of the stream from perhaps as high as 120 Bar to around 15-20 Bar, before entering the ammonia gas recovery vessel 54. With the temperatures indicated on FIG. 1, all of the ammonia and some of the water flash to vapours (the water would boil, the ammonia being driven out of solution) as the final product enters the ammonia gas recovery vessel 54, a consequence of a drop in temperature of more than 100° C. As shown in FIG. 1, the hot pressurised final product transfers its sensible heat to the contents of the ammonia gas recovery vessel 54. This heat input assists to maximise the system's efficiency, as stripping the ammonia from the product as a gas absorbs considerable heat energy. To minimize the waste products generated by the system 10, and prior to entering the pipeline 44 for delivery to the continuous reactor 22, silicate slurry from the mine site is fed and re-circulated in the residual ammonia absorber 56 where residual vapours from the ammonia gas recovery vessel 54 are passed. A gas phase stream exiting from the top of the ammonia gas recovery vessel 54 contains essentially all of the free ammonia, which along with some water vapour condenses out in a condenser 58 to form a liquid phase that is mostly ammonia. In an embodiment, the condenser 58 is cooled by circulating water from dry (e.g. radiator-type) cooling towers, fin fan coolers, or, because no fans are required, a natural-draft cooling tower (not shown) such as used for cooling in the power station. This recovered liquid ammonia, representing the bulk of the ammonia injected into the circulating slurry in the absorption chamber 28, flows under pressure (aided by pumps, not shown) through an overland ammonia pipeline 60 to the power station site.

The final product carbonate slurry (containing nearly all of the carbon dioxide in the original power station flue gases but now sequestered as carbonates), leaves the bottom of the ammonia gas recovery vessel 54. The final product slurry is free of ammonia, and in a form suitable for permanent emplacement in mine voids or other purpose-built repositories (not shown). In these emplacements the solids can settle and consolidate, releasing much of the aqueous phase as a clear supernatant. This supernatant may be collected and re-used in the process, for example, to prepare the silicate slurry 36 and returned to the power station site, via pipeline 44.

Figure 1A:
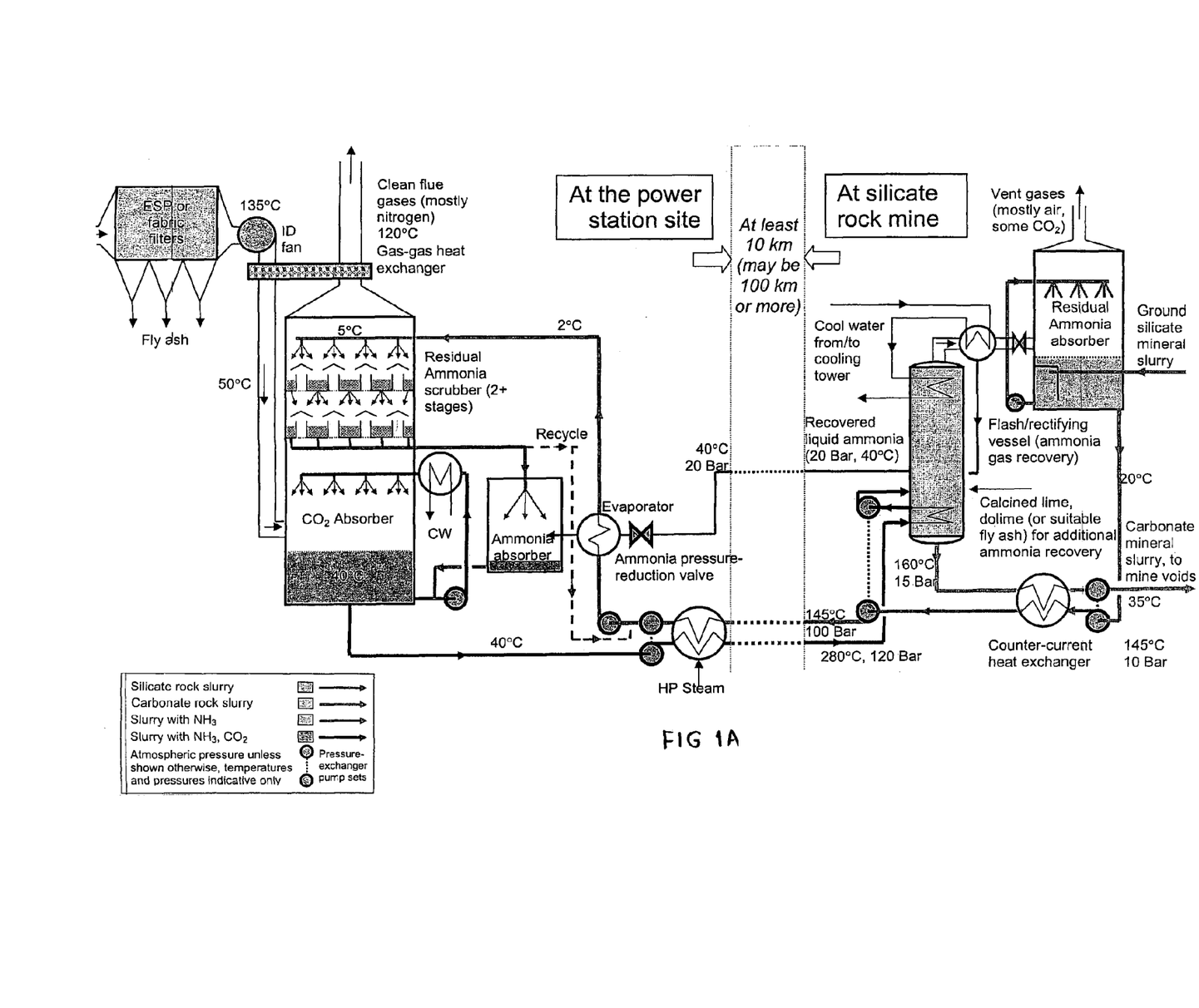
FIG. 1A is a further schematic of a carbon dioxide sequestration system according to an embodiment of the present invention with additional detail of the Residual Ammonia scrubber, Ammonia absorber, and $CO_2$ absorber shown.

It should be noted that not all of the ammonia added in the first apparatus 20 can be recovered and returned to the process via the overland ammonia pipeline 60. Some ammonia may end up as ammonium salts: sulphites and sulphates, and as ammonium nitrites and nitrates, from SOx and NOx respectively in the raw flue gases. If the raw flue gas source is a flue gas generated by a typical fossil fuel-fired power station, and assuming use of modern low-NOx burners, losses of ammonia via these reactions should will be minor. Their presence in the final carbonate product slurry may furthermore, assist with rehabilitation of the final emplacements of the carbonate minerals. FIG. 1A illustrates an alternative embodiment including a residual ammonia scrubber positioned within the scrubbing chamber 30.

It may be desirable to reduce the losses of ammonia that would occur in this way. In an embodiment, this is achieved by dosing, or otherwise adding to the reacted slurry immediately prior to its entry into the ammonia recovery vessel 58, an appropriate quantity of slaked lime or other suitable alkali. A source of such alkali may be power station fly ash or pulverised bottom ash. The presence of limestone or dolomite in the original coal may render them suitable for this duty; in passing through the boilers much of this limestone or dolomite will be converted to alkalis suitable for ammonia recovery: quicklime or dolime (dolomite-lime), respectively.

Should it arise that the content of limestone or dolomite in the coal fuel is inadequate for the duty (as is likely to be the case with most power station fly ashes), it is possible to dose the appropriate quantity of pulverised limestone or dolomite to the power station boilers (not shown). This dosing may be conducted at a location in the hot combustion gas path where the gas temperatures are in the range 800-1,000° C., i.e. sufficient to convert these minerals to the reactive oxide forms (lime, or dolime respectively). For example, this may occur upstream of the boiler's economiser. When the ammonia-recovery vessel is close to the power station, as it would be in the case of the underground chamber reactor embodiment (FIG. 5), it may be appropriate to add all of the power station fly ash to the final product slurry to maximise the regeneration of ammonia for re-use in the process. In this manner, both fly ash and the final product slurry from the carbon sequestration process may be handled and co-disposed of as a single stream. An anticipated advantage stemming from the presence of fly ash having pozzolanic properties (a tendency to set in the presence of alkalis and moisture) in the final product, will assist with the rehabilitation process, by encouraging the final product/fly ash mix to "set".

Figure 3:
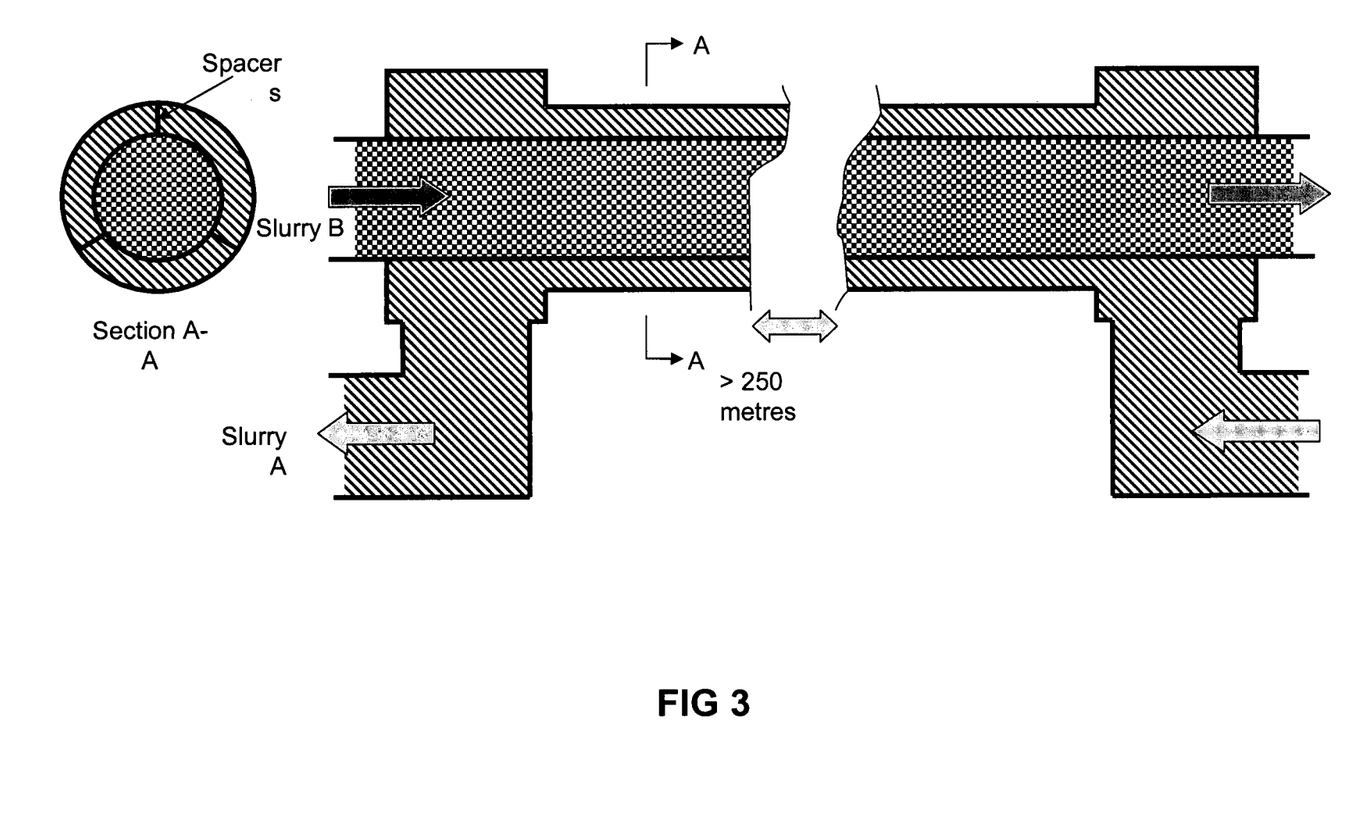
FIG. 3 is a schematic of a pressure exchange apparatus utilised by the carbon dioxide sequestration system of FIG. 1, in accordance with an embodiment of the present invention.

With reference to FIG. 3, there is shown an arrangement for the pressure-exchange apparatus described above. At the end of the reaction process, the pressure of the final carbonate-rich product must be reduced from approximately 120 Bar to atmospheric pressure. As described above, this is undertaken in two stages: from 120 Bar down to around 15 Bar, a pressure suitable for operation of the ammonia recovery stage, then from 15 Bar down to atmospheric pressure. Instead of merely reducing pressure by throttling valves, thereby losing the energy embodied in this pressure, the energy this pressure represents may be conserved by transferring it to the extent possible, in two stages, to the silicate slurry. In FIG. 3, slurry A comprises the products of the reactions that occur as the ammoniated, carbonated silicate slurry flow through the pipeline 44 from the power station to the mine site; while slurry B represents silicate slurry from the mine. A consequence of pressure exchange in these two stages is that slurry A's pressure would fall from around 120 Bar to near ambient pressure, while that of slurry B would rise: in the first stage (working from right to left) to around 10 Bar, then to perhaps 100 Bar in the second stage.

Another pressure-exchange apparatus is also utilised at the power station site. Here, using the terminology of FIG. 3, slurry A represents the hot silicate slurry arriving via the pipeline from the mine; while slurry B comprises slurry exiting the scrubbing chamber 30 (i.e. silicate slurry now charged with ammonia and carbon dioxide, but at close to ambient pressures). A consequence of pressure exchange in this stage is that slurry A's pressure would fall from its arrival pressure (this may be 120 Bar, a pressure that would be maintained by booster pumping stations at strategic locations (not shown) along the pipeline 44 to overcome friction losses), to near ambient pressure. This pressure may be transferred (exchanged) to the extent possible to slurry B, thereby minimising the amount of pumping energy required to raise the pressure of this slurry to the levels required, here assumed to be 120 Bar. Since slurry A at this point will be at well below 120 Bar, pressure-exchange between slurries A and B alone may not be capable of raising the pressure of slurry B to 120 Bar. Also, the volume of slurry B may exceed that of slurry A. This is because of the much higher contents of carbon dioxide and ammonia, and of water condensed out of the power station flue gases. In an embodiment, additional pumping capacity may be installed to boost slurry B pressures to those required for the pipeline 44, and to pressurise those (relatively small) quantities of slurry B that cannot be pressurised by pressure-exchange with slurry A. For this function, conventional high-pressure diaphragm pumps, such as the Geho pump manufactured by Weir Netherlands b.v., may be implemented. This pumping, together with the pumping energy required to maintain pressures along the length of the pipelines, account for a substantial proportion of the total mechanical energy input to the total process. Other suitable pressure exchange/pump-turbine sets may comprise centrifugal pumps and radial-type hydraulic turbines. As the pressures are relatively high, the type of centrifugal pump may be a multi-stage barrel-type pump.

Figure 4:
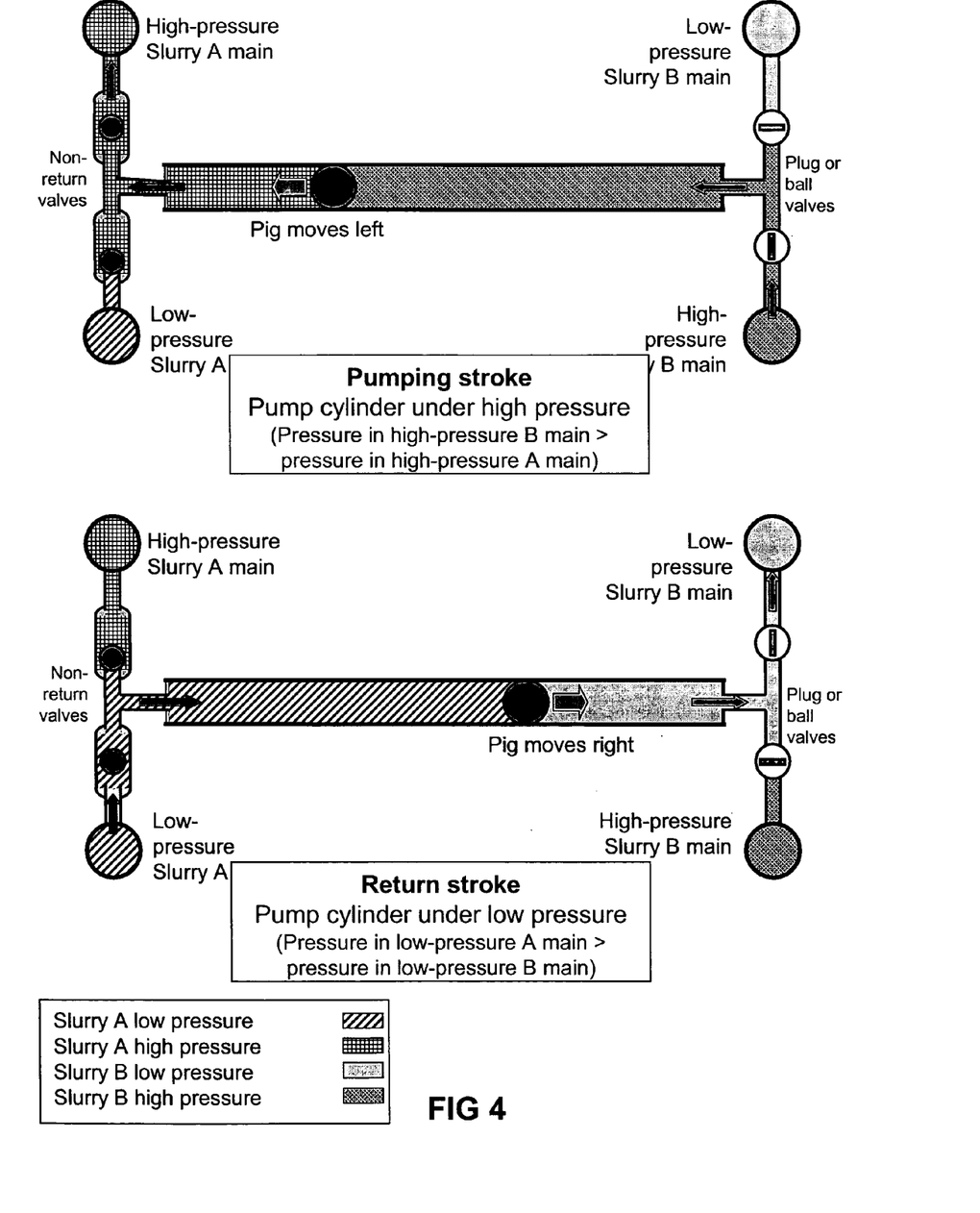
FIG. 4 is a schematic of a heat exchange apparatus utilised by the carbon dioxide sequestration system of FIG. 1, in accordance with an embodiment of the present invention.

With reference to FIG. 4 there is shown a configuration for the heat exchanger arrangements 40 & 46, according to an embodiment of the present invention. As previously discussed, high temperatures are required to initiate and accelerate the carbon sequestration reactions: the conversion of silicates to carbonates. These reactions, being exothermic, yield additional heat that can and should be applied to assist with creating the conditions needed for these reactions to proceed most efficiently. As shown, the heat exchanger arrangement is in the form of a simple shell-and-tube heat exchanger, consisting of two concentric pipes: the inner forms the "tube", the outer, the "shell". An advantage with this arrangement is that the heat exchanger can be made as long as is required to effect the desired transfer of heat: if necessary, many hundreds of meters long. For heat exchanger 40 (i.e. the heat exchanger on the mine site side), heat energy is transferred between the final carbonate/silica product (i.e. slurry A), which is hot, and the silicate slurry (slurry B), which is cool. For heat exchanger 46 (i.e. the heat exchanger on the power station side), slurry A would be hot silicate slurry from the mine, while slurry B would be slurry exiting the scrubbing chamber 30 (i.e. now charged with ammonia and carbon dioxide, but at close to ambient temperatures).

Figure 5:
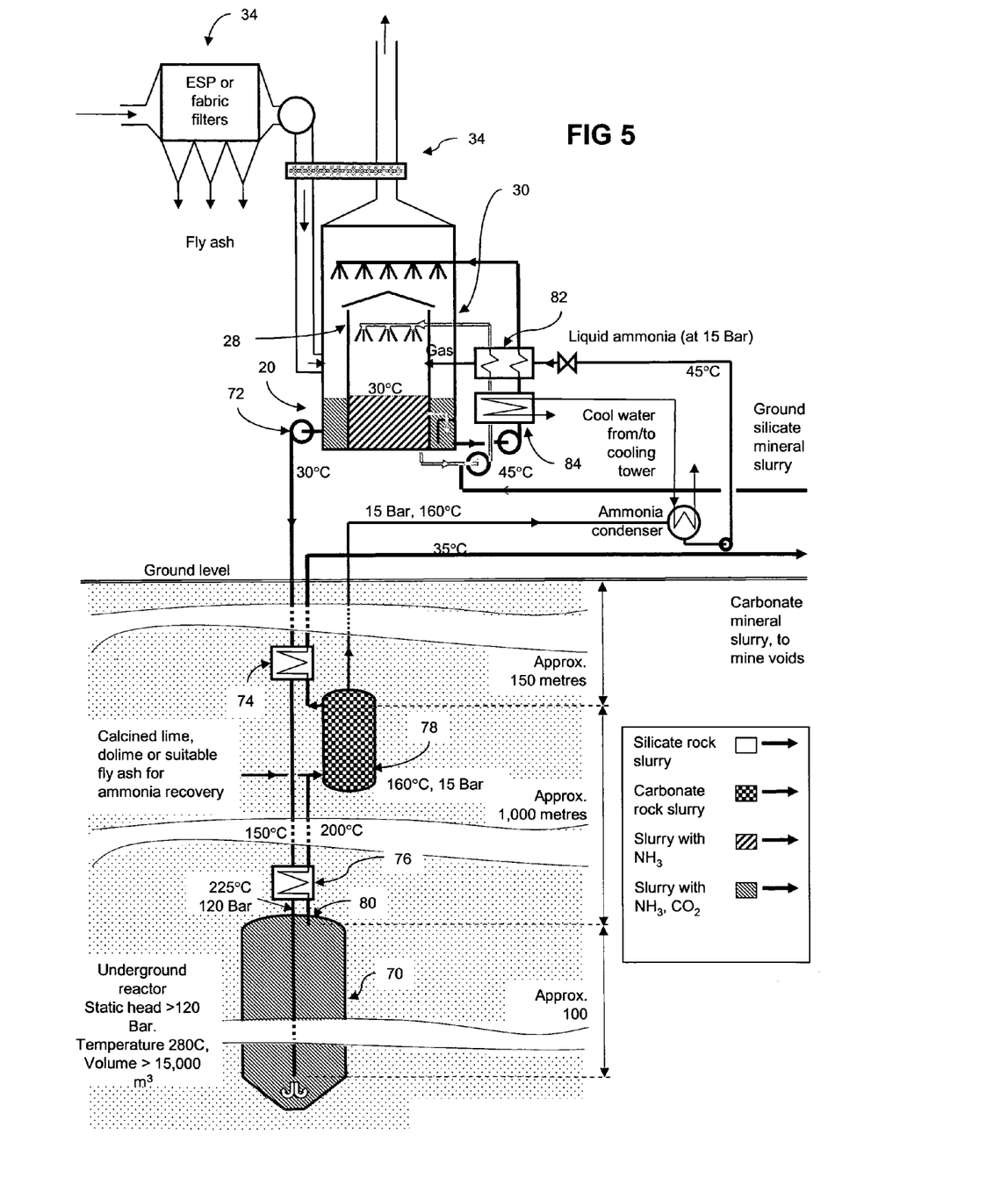
FIG. 5 is a schematic of a carbon dioxide sequestration system, according to an alternative embodiment of the present invention.
Figure 5A:
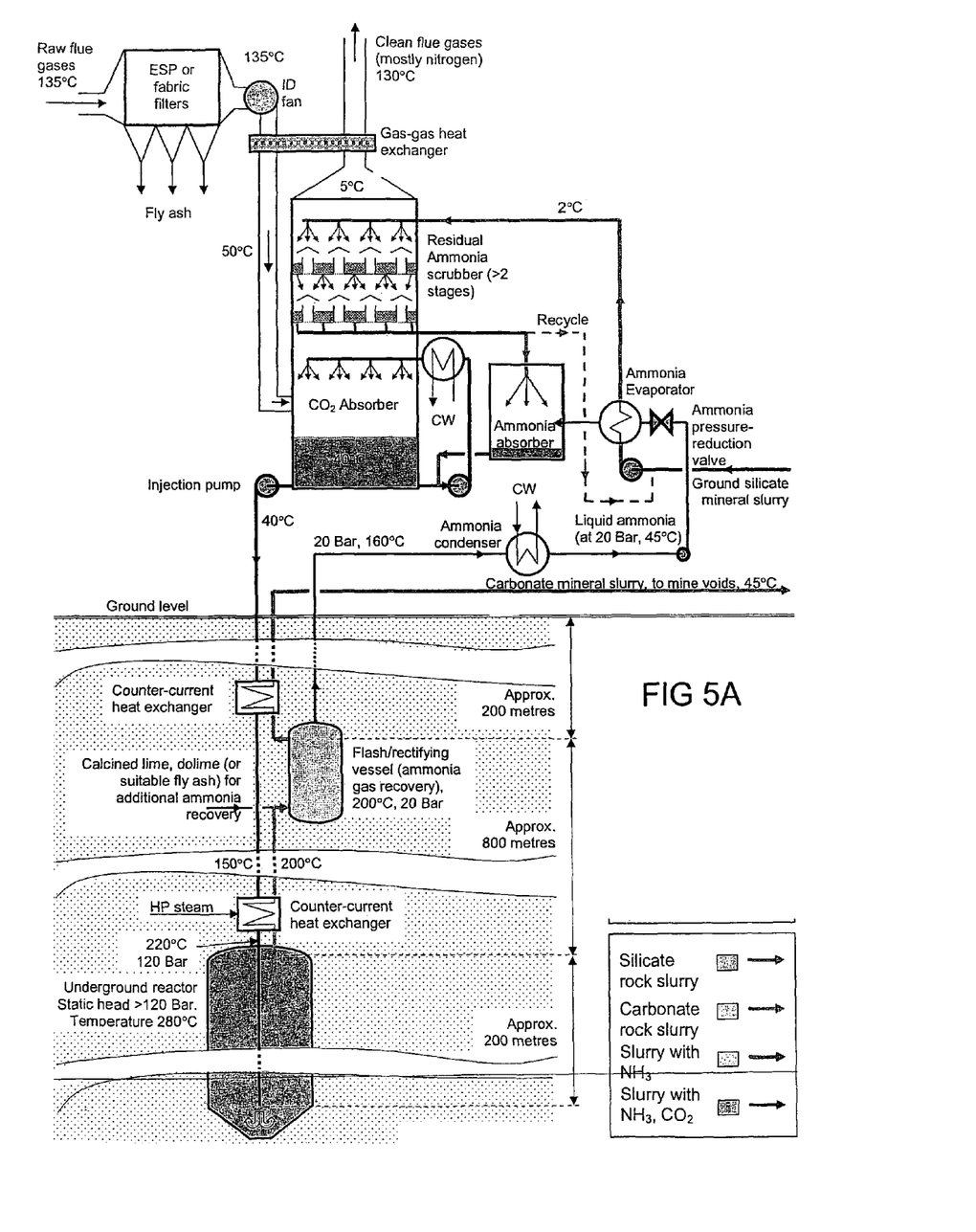
FIG. 5A is a further schematic of a carbon dioxide sequestration system, according to an alternative embodiment of the present invention with additional detail of the Residual Ammonia scrubber, Ammonia absorber, and $CO_2$ absorber shown.

Turning now to FIG. 5, there is shown an alternative system 200 for performing carbon dioxide sequestration which utilises (where geological conditions permit) an underground chamber as the reactor, as opposed to a pipeline reactor as illustrated in FIG. 1. In this embodiment, the reactor is in the form of a chamber 70 excavated from bedrock at a depth sufficient to allow the conditions for the core carbonation reactions to be generated entirely or partly by static head alone (e.g. 120 Bar for the carbonation reactions and 20 Bar for the recovery of ammonia gas from the reaction products). A chamber 70 excavated at a depth of approximately 1,000 meters and having a volume of 150,000 cubic meters, sufficient to allow for a 24 hours detention time for the contents, may be envisaged for holding the reactive slurry output from a system 200 fitted to an efficient 1,000 MWe coal-fired power station. In practice a smaller chamber may suffice, should it arise that the reactions are essentially completed in less time.

The silicate slurry 36 may be prepared either at the serpentine mine site and pumped overland to the power station site, or, the mineral could be railed, trucked or otherwise suitably transported to the power station site, and prepared there. Were the former course of action adopted, pipeline arrangements 44 would be considerably simpler than for the pipeline reactor embodiment described above with reference to FIG. 1. Specifically, the silicate slurry 36 would not be required to collect and transport heat and pressure energy from the mine site to the power station site, nor to host any residual ammonia. The pipeline 44 would simply be utilised for ore transport; whether it was transported as a lump product by rail or as slurry by pipeline would be determined mainly by economic considerations. It will be appreciated that in this embodiment, silicate slurry density could be substantially higher (e.g. 60 percent solids), thereby reducing the volumes of silicate slurry required to be pumped, and allowing a lower pipeline velocity because of the reduced tendency for the solids in denser slurries to segregate and silt up the pipeline 44. Also, arrangements for conserving heat and pressure are much simpler than they would need to be for the pipeline reactor alternative.

In FIG. 5, an injection pump 72 is utilised to drive the circulation of the reactive slurry from the scrubbing chamber 40, through a plurality of counter-current heat exchangers 74, 76, underground reactor 70 and ammonia gas recovery vessel 78 (flash/rectifying vessel) and back to the surface. It is envisaged that a formation of bubbles of ammonia gas may occur as the reacted slurry rises from the underground reactor 70 (a rise accompanied by a loss of static head, hence of pressure), thereby reducing the bulk density of the reacted slurry rising from the reactor. It follows that the required circulation could be achieved by entirely natural means: after the injection pump 72 has achieved the circulation necessary for the reaction to proceed, it may be taken off line. The design of injection pump 72 may be such that it could run backwards, that is to generate power, should the natural rate of circulation created by the buoyancy effect of ammonia bubbles forming in the reactor outlet pipe 80 be sufficiently strong.

Heat exchangers 74, 76 are shown in schematic form at two locations on FIG. 5. In practice, the heat exchangers 74, 76 could be long, shell-and-tube designs, as shown in FIG. 4: they would span most of the vertical distance from the scrubbing chamber 40 down to the underground chamber 70. This is to say, whereas two separate pipelines are implied in FIG. 5, in practice, for most of their length they would be concentric: the annulus formed between the outer and concentric inner pipe would transport the hot reaction products, while the inner pipe would transport the products heading downward to the Reaction chamber. It will be understood by persons skilled in the art that this selection may be reversed.

In contrast to the pipeline reactor configuration shown in FIG. 1, heating of the reactive slurry is accomplished by exchanging heat from the hot reaction products rising first from the ammonia gas recovery vessel 78, and as the raw slurry descended further, from hot slurry rising from the underground chamber 70. While some supplementary heat may be required, the heat generated by Equation 2(b) would be conserved, and available to heat raw reactive slurry.

The design of the underground chamber 70 may be optimised to achieve some plug-flow characteristics. In an embodiment, the chamber 70 may have a high length-to-diameter ratio and be vertically aligned. In this manner, the incoming reactive slurry, being cooler hence slightly denser than the average contents of the reactive chamber 70, would tend to stratify at lower levels, displacing hotter slurry upwards. In an embodiment, the underground chamber 70 may be subdivided into two or more vertically stacked sub-chambers.

There should be no requirement for separate agitation equipment in the reaction chamber to maintain the solids in suspension. As shown in FIG. 5, incoming reactive slurry enters the vessel close to its base, and it is envisaged that settling rates will be small relative to overall slurry up-flow rates. If, however, large residence times are required, implying in turn large reactor volumes, a form of agitation may be implemented.

As will readily be appreciated, heat losses from the underground chamber 70 and pipelines may be much smaller than they would be even from a lagged above-ground pipeline and may be further reduced by insulation surrounding the reactor, pipelines and all other underground process vessels. Whereas an overland pipeline represents a plug-flow reactor, ideal conditions for a relatively slow series of reactions as are involved in carbon sequestration are also obtained in the embodiment illustrated in FIG. 5.

Also in FIG. 5, an alternative ammonia absorption recovery process is utilised. In this embodiment, as the final product slurry rises from the underground chamber 70, the static head it experiences may decrease. A consequence of this is that the boiling point temperature will fall, eventually below that of the slurry rising in the products pipeline, leading to the flashing of some of the water to steam, and the stripping of ammonia from solution. As ammonia comes out of the solution as a gas it will absorb latent heat from the final product slurry, partially cooling it; the temperature would tend to track the boiling point of water at the prevailing pressure. The bubbles of ammonia will reduce the average density of slurry in the hot products pipeline to below that in the incoming reactants pipeline, leading to a pressure differential in the system that would serve to drive the circulation of the reactant and product slurries from the $CO_2$ Absorber 30 and through the underground chamber 70, heat exchangers and other items of process plant. As shown on FIG. 5, the ammonia recovery vessel 78 and other necessary plant and equipment for recovering ammonia from the product slurries are installed at a level (perhaps 150 meters below ground level) that facilitate the use of static head to maintain a pressure in the vessel 78 of around 15 Bar, i.e. high enough so that ammonia was a liquid at near-ambient temperatures.

As for the pipeline reactor case, the ammonia will be discharged as a gas from the top of the vessel 78, however due to the circumstances outlined above, this vessel 78 could be much simpler in design and, in an embodiment, need be little more than a gas-liquid separator. While some additional heat energy may be required to recover essentially all of the ammonia as a gas, typically as steam, with the arrangements proposed the heat-energy burden of carbon sequestration could be greatly reduced.

EXAMPLES

Figure 2:
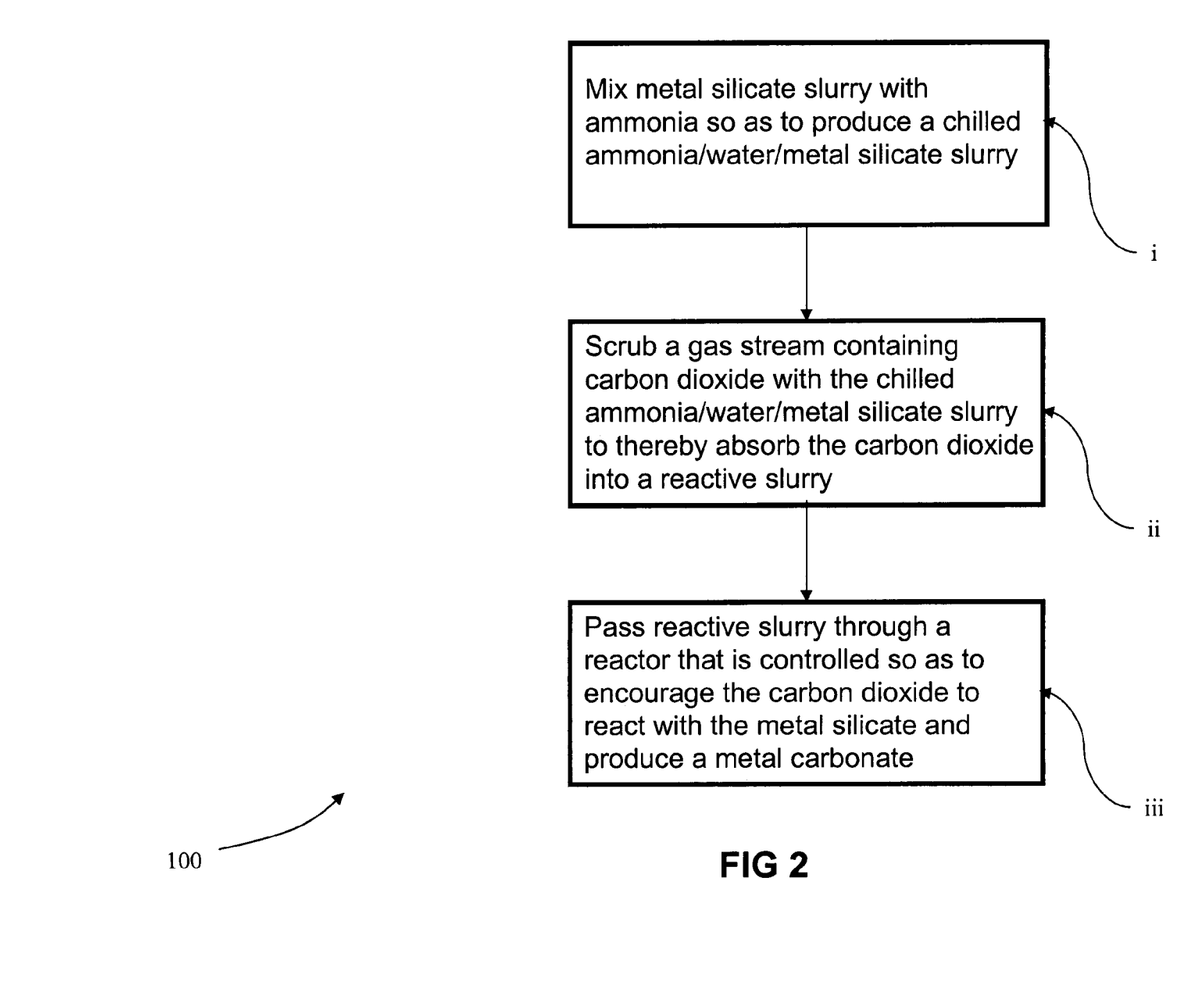
FIG. 2 is a process flow diagram showing a method of sequestering carbon dioxide using the system of FIG. 1, in accordance with an embodiment of the present invention.

Again with specific reference to FIG. 2, a non-limiting example process flow for carbon sequestration for the first system configuration 10 described herein (i.e. the system depicted in FIG. 1) will now be given, wherein for convenience, like parts to those shown in the foregoing embodiment have been numbered with like numerals.

Example 1

TABLE 1

Indicative mass and heat balance figures from 1,000 MWe of black coal-fired electricity generation plant.

| Material | Per year | Per hour |
| --- | --- | --- |
| Total $CO_2$ generated: | 6.4 m. tonnes | 800 t |
| Silicate rock to absorb 90% of this $CO_2$: | 14.5 m tonnes | 1,800 t |
| Water required to make 30% by wt slurry: | 33.6 m tonnes | 4,200 t |
| Ammonia to conv. 90% of $CO_2$ to $(NH_4)_2CO_3$: | 4.45 m. tonnes | 560 t |
| Heat liberated (3.6 GJ/t $CO_2$): | | 2,800 GJ |
| Total slurry with $(NH_4)_2CO_3$: | 58 m. tonnes | 7,250 t |
| Slurry density: | 1.3 t/m$^3$ | 1.3 t/m$^3$ |
| Slurry pipe dia. (both with 2 m/s velocity: | 1.0 metres | 1.0 metres |
| Ammonia pipe diameter, 2 m/s velocity | 0.4 metres | 0.4 metres |
| Conc. of ammonia in Absorber aq. phase: | 12% (by wt) | 12% |
| Ammonia lost due to SOx | 16,000 t | 2.0 t |
| Ammonia lost due to NOx | 3,000 t | 0.37 t |
| Other losses of ammonia: | 11,000 t | 1.38 t |
| Ammonia make-up % of flow to Absorber: | 0.67% | 0.67% |

Table 1 provides a detailed mass and heat balance for a carbon dioxide sequestration process, assuming:
  90 percent carbon dioxide capture and sequestration from 1,000 MWe of black coal-fired electricity generation plant, which when operating in base-load mode might expect to generate annually 8,000 GWh of electricity;
  where on a dry ash-free basis, the coal is 81.3% by weight carbon and 0.65% sulphur (as S) and the flue gases contain 400 ppm NOx.

The heat of formation of ammonium carbonate in solution from ammonia, water and carbon dioxide is around 2.0 GJ/tonne carbon dioxide equivalent, sufficient to heat the slurry by 75° C. Offsetting this is the heat absorbed when each tonne of ammonia is vaporised in the absorption zone, around 1.0 GJ/tonne ammonia. This is equivalent to around 1.8 GJ per tonne of carbon dioxide absorbed, sufficient to cool the slurry feed by around 60° C. It follows that there would be an overall temperature rise between the time the slurry feed enters the absorption zone and the time it enters the return pipeline 52, of around 15° C. In practice, it may be necessary to design the process so that the last slurry feed that the final largely carbon dioxide free flue gases is the coldest: less than 5° C.

As well, the heat released when ammonium carbonate in solution reacts with the silicate rocks, roughly 1.45 GJ/tonne carbon dioxide absorbed, is sufficient to raise the temperature of the slurry feed by around 55° C. This occurs in the return pipeline 52.

At the mine, the condensation of around 300 tonnes per hour of ammonia would release some 160 MWt of heat energy, which can be rejected to the environment via a cooling tower.

An advantage of the carbon dioxide sequestration process 100 and systems 10, 20 according to embodiments of the present invention is that by selecting ammonia as a catalyst/promoter, a single integrated process can be provided for both capture and sequestration of carbon dioxide. In an embodiment, sequestration of the carbon dioxide takes place in a reactor, in the form of a return pathway 52 of a pipeline 44, which advantageously connects the power station (i.e. the source of carbon dioxide) to the source/destination of the absorbent material being used in the process. In an alternative embodiment, where geological conditions permit, the reactor may take the form of an underground chamber which advantageously facilitates the reaction without requiring pressure-exchange and head-recovery equipment required for the pipeline embodiment. Another advantage of the carbon dioxide sequestration process and systems is that the reaction kinetics may be improved by using ammonia. Therefore, by using ammonia and exploiting the heat generated by the exothermic reaction, the energy consumption of the process 100 can be kept to a minimum. As the reaction products are thermodynamically stable, carbon dioxide can be stored in a permanent stable solid form. Following from this, further advantages include lower operating and capital costs.

Persons skilled in the art will appreciate that further advantages may arise from carrying out certain steps of the aforementioned embodiments in isolation. For example, the catalytic effect of a solution of ammonia with an ammonium salt (that may be ammonium carbonate formed by exposing an ammonia-rich solution to a gas stream containing carbon dioxide) in the carbon dioxide sequestration process can also be utilised for extracting metals (e.g. magnesium, iron, nickel, copper and other metals present in the silicate rock) from metal silicates, such as magnesium-rich metal silicates. In such an embodiment a solution comprising ammonia and ammonium may be mixed with a metal silicate (typically in slurry form) to allow the dissolution of magnesium ions by ammonia to recover the metal, in this embodiment a metal compound in the form of magnesium carbonate. The mixing may occur in an ammonia absorption chamber such as that previously described in connection with the preceding embodiments. Preferably the ammonia solution comprises concentrated ammonia in the presence of ammonia salts in solution, such as ammonium carbonate, to prevent the precipitation of magnesium hydroxide, hence allowing the dissolution of magnesium ions by ammonia to continue. A further advantage arising from this process is that after extraction of magnesium carbonate, other minerals (metals) present within the silicate rock are also amenable to recovery. The silicate rock may comprise mafic or ultra-mafic rocks (i.e. rocks with a high magnesium content).

The catalytic effect of the ammonia follows from its tendency to form complexes (ammines) with certain metal ions including magnesium ($Mg^{2+}$), divalent iron ($Fe^{2+}$), copper ($Cu^{2+}$) and nickel ($Ni^{2+}$). The presence of ammonium salts, notably the carbonate formed from the reaction between ammonia and carbon dioxide, prevents precipitation of the otherwise insoluble magnesium hydroxide. Magnesium carbonate is however insoluble in such an environment, so a precipitate of this compound will form from the reaction between magnesium hydroxide and ammonium carbonate, to yield ammonium hydroxide and free ammonia in solution, the latter continuing to extract additional magnesium and other metals from the silicate rock through formation of ammine complexes until all such susceptible metals have been extracted.

Subsequently, the ammonia is recovered from the solution by in the ammonia recovery vessel, a consequence being a progressive reduction in the concentration of free ammonia in the reactive slurry. This leads to destruction of the metal ammine complexes, but in a progressive manner, depending on the stability of the complexes, which stability in turn differs between metals. Those of magnesium are relatively weak (the reason most of the magnesium will have precipitated out as magnesium carbonate), so the first salt to be precipitated is further magnesium carbonate. As the concentration of ammonia in solution continues to fall, other metals can precipitate in sequence, allowing the opportunity of obtaining precipitates of each single metal in relatively pure form.

Finally, it is to be appreciated that various alterations or additions may be made to the parts previously described without departing from the spirit or ambit of the present invention. The process is not limited to having a single two-stage continuous reactor, or a single tube-like reactor, as the process may be arranged to utilise alternatively configured items of equipment as necessary to accommodate process variables, arising from different source materials, capital and operating costs. For example, in the exemplary embodiment previously described the plant design is based on the emission of 800 tonnes $CO_2$/GWh generated from a state-of-the-art black coal-fired electricity generation plant. By comparison, the Bayswater Power Station and the Liddell Power Station, both in the Hunter Valley of New South Wales, Australia, able to generate 2,640 MWe and 2,040 MWe respectively, being older hence less efficient can be expected to emit between 850 and 900 tonnes $CO_2$/GWh.

Thus the concentration and rate of carbon dioxide emissions in the flue gas emitted by the power plant may vary such that the plant equipment design may be re-configured to accommodate these variables. For example, alternative equipment can be configured for the various heat and pressure exchange stations. The carbon dioxide absorption zone and the scrubbing zone may be arranged in series in two separate vessels (rather than the nested configuration shown in FIG. 1). The conversion of carbon dioxide to insoluble carbonates may be limited to a lower value, such as 70% whilst still obtaining a good overall conversion from the reactor(s). As well, the corresponding solids concentration in the slurry feed may be higher or lower than 30% solids by weight. It is possible that the metal silicate solution may comprise a blend of metal silicates, e.g. mixture of serpentines and olivines, even pyroxenes. The reaction kinetics may require heat to be removed from the reactive solution (rather than heat addition as described above). These factors will impact and alter the system pressures. There might be two or more pipelines for transporting the metal silicate solution and the reactive solution; because there are more pipelines additional heat exchangers and pressure-exchange apparatus may be used. The power station flue gas may include additional pre-processing steps including flue gas desulphurisation (FGD) and selective catalytic reduction (SCR) to reduce concentrations of SOx and NOx respectively hence losses of ammonia from the system. Furthermore, the availability of services, such as steam and cooling water may require different equipment arrangements.

Any reference to prior art contained herein is not to be taken as an admission that the information is common general knowledge, unless otherwise indicated.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A carbon dioxide sequestration process including the steps of:
   (i) providing a slurry comprising metal silicate rock;
   (ii) in a first stage, mixing the slurry of metal silicate rock with ammonia so as to produce an ammonia/water/metal silicate slurry;
   (iii) in a second stage, scrubbing a gas stream containing carbon dioxide with the slurry from (ii) to thereby absorb the carbon dioxide into the slurry so as to form a reactive slurry;
   (iv) in a third stage, passing the reactive slurry from (iii) through a reactor that is controlled so as to promote a reaction between the carbon dioxide and the metal silicate and produce a metal carbonate; and
   (v) recovering ammonia resulting from the reaction stage (iv) and recycling it to the first stage wherein the ammonia recovery is effected in a recovery vessel which is pressurized to facilitate the recovery of ammonia in liquid form.

2. A process in accordance with claim 1, wherein in step (ii), pressurized liquid ammonia is charged into the metal silicate slurry in such a manner that the liquid ammonia partially flashes to a vapors to produce the ammonia/water/metal silicate slurry.

3. A process in accordance with claim 1, wherein the step of scrubbing the gas stream comprises exposing the carbon dioxide-containing gas stream into a spray of the slurry.

4. A process in accordance with claim 1, wherein controlling the reactor comprises elevating at least one of a pressure and temperature of the reactor so as to enhance the reaction between the carbon dioxide and the metal silicate.

5. A process in accordance with claim 1, wherein the reactor is a pipeline.

6. A process in accordance with claim 5, wherein the pipeline comprises multiple flow paths and wherein the reaction takes place along the length of one of the flow paths.

7. A process in accordance with claim 6, wherein another of the flow paths utilized to supply the metal silicate slurry from a source.

8. A process in accordance with claim 7, comprising the further step of exchanging at least one of pressure and heat between the reactive slurry and the metal silicate slurry before and/or after the pipeline.

9. A process in accordance with claim 1, wherein the reactor is a chamber located underground.

10. A process in accordance with claim 9, wherein the chamber is located at a depth that provides sufficient pressure to enhance the reaction between the carbon dioxide and the metal silicate.

11. A process in accordance with claim 1, comprising the further step of introducing an alkali to the metal carbonate product resulting from the reaction stage (iv) prior to carrying out the ammonia recovery step.

12. A process in accordance with claim 1, wherein the ammonia is recovered as both a liquid and a gas, with the liquid being converted partially to a vapour for recycling in the first stage and the gas being extracted, condensed and mixed with the metal silicate before it is supplied in the first stage.

13. A process in accordance with claim 1, wherein the recovery vessel is in use located at a depth sufficient for achieving the pressure to recover the ammonia in liquid form.

14. A process in accordance with claim 1, comprising the further step of grinding a metal silicate rock to produce the metal silicate slurry.

15. A process in accordance with claim 14, wherein the metal silicate slurry comprises ground metal silicate.

16. A process in accordance with claim 1, wherein the metal silicate is a magnesium-rich silicate comprised of a serpentine- and/or olivine- and/or pyroxene-rich mineral.

17. A process in accordance with claim 1, wherein the slurry of metal silicate rock is chilled prior to passing the slurry to the second stage.

18. An ammonia absorption process in a carbon dioxide sequestration process, the ammonia absorption process comprising the steps of:
   (i) producing a slurry of metal silicate rock mixed with ammonia so as to produce an ammonia/water/metal silicate slurry;
   (ii) provide pressurized ammonia in liquid form;
   (iii) expanding the pressurized ammonia in liquid form in an evaporator stage so as to provide a cooling effect in that stage; and
   (iv) passing the ammonia/water/metal silicate slurry through the evaporator stage so as to produce a chilled ammonia/water/metal silicate slurry.

19. The ammonia absorption process in accordance with claim 18, comprising the further step of providing the chilled ammonia/water/metal silicate slurry to a scrubbing stage that comprises a scrubbing chamber, wherein a gas stream containing carbon dioxide is scrubbed with the chilled ammonia/water/metal silicate slurry to thereby absorb the carbon dioxide into a reactive slurry.

20. The ammonia absorption process in accordance with claim 19, comprising the further steps of: passing reactive slurry through the evaporator stage; and recirculation of the reactive slurry through the scrubbing chamber; wherein; the evaporator stage is carried out in an evaporation chamber.

* * * * *